United States Patent [19]

Ryoke et al.

[11] Patent Number: 5,212,019
[45] Date of Patent: May 18, 1993

[54] MAGNETIC RECORDING MEDIUM HAVING A MAGNETIC LAYER CONTAINING FERROMAGNETIC METAL POWDER, BINDER, FATTY ACID ESTER, AND A SPECIFIED BRANCHED CHAIN FATTY ACID

[75] Inventors: Katsumi Ryoke; Yutaka Kakuishi; Masaki Suzuki, all of Kanagawa, Japan

[73] Assignee: Fuji Photo Film Co., Ltd., Kanagawa, Japan

[21] Appl. No.: 940,733

[22] Filed: Sep. 8, 1992

Related U.S. Application Data

[63] Continuation of Ser. No. 765,229, Sep. 25, 1991, abandoned.

[30] Foreign Application Priority Data

Sep. 27, 1990 [JP] Japan .................................. 2-255229

[51] Int. Cl.$^5$ ............................................. G11B 5/00
[52] U.S. Cl. ............................ 428/694 BB; 428/900; 428/694 BG; 428/694 BP; 428/694 BR; 428/694 BN; 252/56 R
[58] Field of Search .................... 428/694, 695, 900; 252/56 R

[56] References Cited

U.S. PATENT DOCUMENTS 4,283,314 8/1981 Zeilstra et al. ................ 260/23 A R
4,420,540 12/1983 Ogawa et al. ........................ 428/457

*Primary Examiner*—Paul J. Thibodeau
*Assistant Examiner*—Stevan A. Resan
*Attorney, Agent, or Firm*—Sughrue, Mion, Zinn, Macpeak & Seas

[57] ABSTRACT

A magnetic recording medium in which the generation of white powder is suppressed, which recording medium maintains an appropriate running tension and exhibits a reduced level of dropouts and head clogging, comprising a non-magnetic support having thereon a magnetic layer, the magnetic layer containing a ferromagnetic powder and a binder, the ferromagnetic powder is a ferromagnetic metal powder and the magnetic layer contains a branched chain fatty acid represented by formula (I):

$$R_2CH(CH_2)_mCOOH \qquad (I)$$

wherein R represents $CH_3(CH_2)_n$, n represents an integer of 8 or more, and m represents 0 or 1 in an amount of from 0.5 to 3 parts by weight per 100 parts by weight of said ferromagnetic metal powder.

4 Claims, No Drawings

MAGNETIC RECORDING MEDIUM HAVING A MAGNETIC LAYER CONTAINING FERROMAGNETIC METAL POWDER, BINDER, FATTY ACID ESTER, AND A SPECIFIED BRANCHED CHAIN FATTY ACID

This is a continuation of application No. 07/765,229 filed Sep. 25, 1991.

FIELD OF THE INVENTION

The present invention relates to a magnetic recording medium, and more particularly to a magnetic recording medium having excellent running properties and durability.

BACKGROUND OF THE INVENTION

In order to accommodate increased recording density of magnetic recording media, the surface property of the constituent magnetic layers has been smoothened. For this reason, the coefficient of friction of the magnetic layers with the respective parts of a recording and reproducing apparatus is disadvantageously increased, to thereby hinder smooth running of the magnetic recording media and to result in damage to the magnetic layers.

Furthermore, since the use of video tape recorders (VTR), personal computers, word processors, etc. has recently become popular, magnetic recording media are used under wider conditions of temperature and humidity. It has therefore been desired to provide magnetic recording media of both high quality and durability.

In order to address such problems, the use of various lubricating agents has been proposed.

The use of straight chain fatty acids as lubricating agents has been proposed in JP-B-51-39081 (the term "JP-B" as used herein means an "examined Japanese patent publication"). Straight chain fatty acids such as stearic acid have a strong effect of lowering the $\mu$ value (coefficient of friction), but tend to generate white powder due to their high melting point which causes head clogging or an increase in drop out (hereinafter referred to as "DO"). In order to prevent the generation of white powder, the use of various branched chain fatty acids having a low melting point has been proposed.

For example, JP-B-48-15077 discloses magnetic layers containing branched chain fatty acids having a melting point of 20° C. or less and at least 12 carbon atoms. All of the fatty acids are branched chain fatty acids having different branched carbon chain lengths. JP-A-59-172131 and JP-A-59-172133 disclose magnetic layers containing naphthenic acids. These are cyclic fatty acids (the term "JP-A" as used herein means an "unexamined published Japanese patent application").

The branched chain fatty acids having different carbon chain lengths and the cyclic fatty acids have a low melting point, but do not have the effect of lowering the $\mu$ value. As a result, these fatty acids do not sufficiently improve running tension.

Furthermore, JP-A-2-56722 discloses branched chain fatty acid esters. Although the still durability can be significantly improved by using such esters, the number of DOs (dropouts) and the head clogging are not improved when the esters comprise conventional fatty acids. As long as conventional fatty acids are used, it has been desired to concurrently solve the problems of dropout, head clogging and running tension.

SUMMARY OF THE INVENTION

It is therefore an object of the present invention to provide a magnetic recording medium that does not generate white powder, that maintains an appropriate running tension, and that reduces the occurrence of dropout and head clogging.

Other objects and effects of the present invention will be apparent from the following description.

The present invention provides a magnetic recording medium comprising a non-magnetic support having thereon a magnetic layer containing a ferromagnetic powder and a binder, the ferromagnetic powder being a ferromagnetic metal powder, and the magnetic layer containing a branched chain fatty acid represented by formula (I):

$$R_2CH(CH_2)_nCOOH \qquad (I)$$

wherein R represents $CH_3(CH_2)_n$, n represents an integer of 8 or more, and m represents 0 to 1 in an amount of from 0.5 to 3 parts by weight per 100 parts by weight of the ferromagnetic metal powder.

DETAILED DESCRIPTION OF THE INVENTION

In accordance with the present invention, the branched chain fatty acid having long branched carbon chains solves the problems of DO and the head clogging under conditions of elevated temperature and humidity. At the same time, the branched chain fatty acid provides improved running tension.

Previously, long straight carbon chain fatty acids (for example, stearic acid) have been conveniently used as lubricating agents because of their excellent effect of reducing the $\mu$ value. However, under accelerated testing, when the magnetic recording medium was stored under conditions such as 60° C. and 80% RH (acceleration test), white powder was produced, which resulted in head clogging and an increase in DO.

In order to prevent the generation of white powder, branched chain fatty acids having a low melting point (for example, isostearic acid) were used. As a result, the problem of white powder was significantly improved, but the $\mu$ value was increased to thereby conversely deteriorate the running tension. An analysis of this problem revealed that the above noted conventional branched chain fatty acids which were previously employed due to their good availability, had both long carbon chains and short carbon chains.

In the present invention, long branched chain fatty acids having branched carbon chains of equal length are used, such that the melting point is lowered due to the branched chains and the generation of white powder is markedly reduced. Furthermore, the fatty acid of the present invention is easily oriented on the surface of a magnetic layer because it is a long branched carbon chain fatty acid. As a result, the effect of reducing the $\mu$ value is pronounced, which results in a decrease in running tension. Namely, in the present invention, the melting point of the fatty acid is lowered by the branched chains to prevent generation of white powder, while maintaining the excellent effect of reducing the $\mu$ value as compared to a straight chain fatty acid. Long branched chain fatty acids having the same branched carbon chains are somewhat difficult to produce and are expensive, and for this reason were not investigated as lubricating agents. However, the present inventors have discovered that these long branched chain fatty acids exhibit the above described unexpected excellent effects of the present invention.

The compounds for use in the present invention can be arranged not only in a magnetic layer of a coating type magnetic recording medium comprising a ferromagnetic metal powder and a binder, but also in a magnetic layer of a magnetic recording medium comprising a non-magnetic support having thereon a magnetic layer of a metal film formed by vapor deposition.

The branched chain fatty acids for use in the present invention (hereinafter also referred to as the "compounds of the present invention") are added in an amount of from 0.5 to 3 parts by weight, per 100 parts by weight of the ferromagnetic metal powder contained in the same layer.

There is no particular limitation on methods for incorporating the compounds of the present invention into or on the surface of the magnetic layer. Examples thereof include a method of incorporating the compound into a magnetic coating composition for a magnetic layer, and a method of forming the compound on the surface of the magnetic layer as a top coat (e.g., method of dissolving the compound of the present invention in an organic solvent and coating or spraying the solution on the magnetic layer, followed by drying; a method of melting the compound of the present invention and coating the melt on a magnetic layer; a method of dipping the magnetic layer in a solution of the compound of the present invention in an organic solvent to adsorb the compound onto the surface of the magnetic layer; and the compound onto the surface of the magnetic layer; and the Langmuire-Blodgett technique or the like). Among these, a method in which the compound of the present invention is formed as a top coat is preferably used.

The coated amount of the compound of the present invention to be added as a top coat is generally in the range of from 5 to 1,500 mg/m², and preferably from 10 to 300 mg/m².

If the amount of the compound exceeds the above range, the excess amount of the compound of the present invention on the surface of the magnetic layer tends to result not only in sticking and moisture absorption in some cases, but also causes the binder contained in the magnetic layers to plasticize, to thereby reduce the running durability. If the amount is less than the above noted range, the compound is present on the surface of the magnetic layer in an insufficient amount such that an adequate lubricating effect tends no to be obtained.

For the compound of the present invention, n is 8 or more in formula (I), namely, the total number of carbon atoms is 20 or more. Although there is no particular limitation on the upper limit, n is preferably 20 or less.

Preferred examples of the compound of the present invention include branched chain fatty acids where m is 1 and n is 8 or 10, and branched chain fatty acids where m is 0 and n is 9, 11 or 14.

In the present invention, branched chain fatty acid esters having a melting point of 20° C. or less are preferably contain in the magnetic layer to augment the effects of the compound of the present invention. The fatty acid esters need not be esters composed of the compounds within the scope of formula (I) of the present invention.

Preferred examples of the branched chain fatty acid esters include esters of branched chain fatty acid moieties having 10 to 30 carbon atoms, preferably 14 to 22 carbon atoms, and alcohol moieties having 3 to 3 carbon atoms, preferably 4 to 18 carbon atoms.

The amount of the branched chain fatty acid esters is generally from 0.1 to 20 wt%, and preferably from 0.5 to 3 wt%, based on the total amount of the ferromagnetic metal powder.

The ferromagnetic metal powder for use in the present invention is a powder mainly composed of single metal substances or alloys, and may partly contain non-ferromagnetic metals as long as the powder is ferromagnetic as a whole.

In the present invention, the center line average surface roughness (Ra) (according to JIS B0601 and ANSI B 46.1) of the magnetic layer is preferably 15 nm or less, and more preferably 5 nm or less.

In the present invention, oleic acid is preferably contained in the magnetic layer as a dispersing agent. Oleic acid is preferably added in an amount of from 0.1 to 2 parts by weight based on 100 parts by weight of the ferromagnetic metal powder contained in the same layer.

The magnetic layer preferably contains phenylsulfenic acid or an alkyl phenylphosphonate, such as methyl of from 0.05 to 1 mol per mol of ferromagnetic metal powder contained in the same layer.

The magnetic layer preferably contains phenylsulfinic acid or an alkyl phenylsulfinate, such as methyl phenylsulfinate and dimethyl phenylsulfinate, in an amount of from 0.05 to 1 mole of ferromagnetic metal powder contained in the same layer.

The magnetic layer preferably contains phenylsulfenic acid or an alkyl phenylsulfenate, such as methyl phenylsulfenate and dimethyl phenylsulfenate, in an amount of from 0.05 to 1 mol per mol of ferromagnetic metal powder contained in the same layer.

The effects of the present invention are preferably pronounced when the surface of the magnetic layer is subjected to an abrasion treatment with a hard material.

Examples of hard abrasion materials for use in the present invention include inorganic materials having a Mohs' hardness of from 7 to 10. Examples thereof include diamond, sapphire, alumina, tungsten carbide, titanium carbide, tantalum carbide, vanadium carbide, chromium carbide and silicon carbide. Preferred examples thereof include diamond, sapphire, alumina, cobalt-containing tungsten carbide (containing 5 to 30% by weight, preferably 7 to 155 by weight of Co, based on tungsten carbide) and cobalt-containing tungsten carbide-titanium carbide.

Methods for treating the surface of the magnetic layer using the hard material in accordance with the present invention include a method using a coating sheet for removing projections of inorganic powders (such as the ferromagnetic powder, an abrasive agent and an antistatic agent) from the surface of the magnetic layer, a method of bringing a blade into abutting contact with the magnetic layer (blade method), and the diamond wheel (rotary blade) method.

Preferred examples of the coating sheet include those coated with particles of the above-described hard materials having a particle size of from 0.01 to 5 $\mu$m.

The blades are preferably formed by sintering powders of the above-described hard materials onto a blade, the powders preferably having a particle size of from 0.1 to 1.5 $\mu$m.

In the blade method, the included angle of the hard materials is 5 to 180 degrees, and preferably 5 to 90 degree. When the magnetic recording medium is a tape, the included angle of the hard materials is 0.1 to 180 degrees, preferably 30 to 100 degrees, and more preferably 60 to 90 degrees. The upstream lap angle is preferably 60 to 170 degrees, and more preferably 80 to 170 degrees. The downstream lap angle is preferably 0 to 90 degrees, and the pressing force to the tape is preferably 1 to 100 g. The tape tension is preferably 1 to 300 g, and more preferably 50 to 250 g. The tape speed V is preferably 60 to 1,200 m/min, and more preferably 200 to 500 m/min.

In the case of diamond wheel treatment, the wheel is preferably rotated in the opposite direction to the running direction of the tape. The pressing force is preferably 1 to 300 g; the tension is preferably 1 to 300 g, and more preferably 5 to 120 g; and the tape speed V is preferably 60 to 1,200 m/min, and more preferably 200 to 700 m/min, at a contact angle $\theta$ of 90 to 180 degrees, preferably 120 to 170 degrees ($\theta$ represents the angle of the contact portion of the wheel and the tape).

The surface of the magnetic layer if the present invention treated with a hard material preferably has an Ra value (according to JIS B0601 and ANSI B 46.1) (at a cut off value of 0.08 mm) of 1 to 15 nm, preferably 1 to 10 nm, and small projections of 10 to 100 nm in an amount of from $1 \times 10^3$ to $1 \times 10^9$ projections/mm$^2$.

The above-described hard material abrasion treatment is preferably carried out after calender treatment and subsequent to coating of the magnetic layer.

The magnetic layer of the present invention is preferably calender using a known calendering technique. Known calender units may be used for the calender treatment. Examples thereof include at least a pair of metal rolls, at least a pair of a metal roll and a resin roll, and combinations thereof. In particular, multi-stage rolls consisting of metal rolls and elastic rolls are desirable. In this case, the temperature of the metal rolls is 50° to 150° C., and preferably 70° to 120° C. the line pressure is 100 to 500 kg/cm, and preferably 200 to 400 kg/cm. The transferring speed is 40 to 1,000 m/min, and preferably 100 to 600 m/min.

The branched chain fatty acids for use in the present invention represented by formula (I) are commercially available (for example, from Wako Pure Chemical Industries Ltd.). However, these compounds can be synthesized by the following methods (for example, the methods described in J. D. Roberts and M. C. Caserio, *Basic Principles of Organic Chemistry*, Chapter 16, Table 16-5, published by W. A. Benjamin, Inc., New York, U.S.A. in 1964):

1. Method Using a Malonic Ester

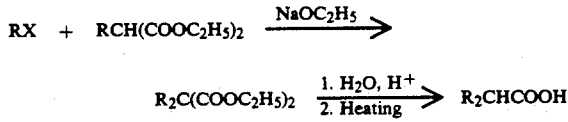

2. Method Using an Acetoacetic Ester

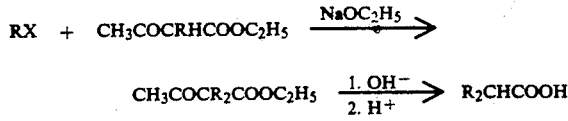

In the present invention, known lubricating agents other than the compounds of the present invention and the above-described branched chain fatty acid esters, may be used in combination.

Examples of the lubricating agents used in combination include saturated or unsaturated fatty acids (such as myristic acid, stearic acid and oleic acid) and metal soaps thereof; N-substituted or N-unsubstituted fatty acid amides; fatty acid esters (such as esters of fatty acids with polyhydric alcohols such as sorbitan and glycerol, and esterified products of polybasic acids, as well as various kinds of monoesters); esters compounds having ether linkages) higher aliphatic alcohols; monoalkyl phosphates; trialkyl phosphates; paraffins; silicone oils; fatty acid-modified silicone oils; animals and vegetable oils; mineral oils; higher aliphatic amines; inorganic fine particles of graphite, silica, boron nitride, fluorinated graphite, calcium carbonate, barium sulfate, molybdenum disulfide, tungsten disulfide and the like; polymer powders such as powders of polyolefin or $\alpha$-olefin resins such as polyethylene, polypropylene, polyvinyl chloride, ethylene-vinyl chloride copolymers and polytetrafluoroethylene, fine powders of melamine resins, fine powders of polyimide resins and the like; unsaturated aliphatic hydrocarbons which are liquids at room temperature; terminus-modified or unmodified perfluoroalkyl polyethers; and fluorocarbons.

The above described lubricating agent employed together with the compound represented by formula (I) of the present invention is generally contained in the magnetic layer in an amount of from 0.1 to 2 times that of the compound of the present invention on a weight basis, although the amount varies depending the intended use.

In the present invention, known thermoplastic resins, thermosetting resins, radiation hardening type resins, reactive resins and mixtures thereof which have conventionally been used as a binder for magnetic recording media can be used as a binder for the magnetic layer.

The above-described thermoplastic resins include vinyl copolymers such as vinyl chloride copolymers, vinyl chloride-vinyl acetate copolymers, copolymers of vinyl chloride and vinyl acetate with vinyl alcohol, maleic acid and/or acrylic acid, vinyl chloride-vinylidene chloride copolymers, vinyl chloride-acrylonitrile copolymers and ethylene-vinyl acetate copolymers; cellulose derivatives such as nitrocellulose, cellulose acetate propionate and cellulose acetate butyrate resins; acrylic resins; polyvinyl acetal resins; polyvinyl butyral resins; polyester-polyurethane resins; polyether-polyurethane resins; polycarbonate-polyurethane resins; polyester resins; polyether resins; polyamide resins; amino resins; rubber type resins such as styrene-butadiene resins and butadiene-acrylonitrile resins; silicone resins; and fluororesins.

Of these resins, vinyl chloride copolymers are preferred as enhancing the dispersibility of the ferromagnetic powder.

Thermosetting resins and reactive resins have a molecule weight which is significantly increased upon heating. Examples of such resins include phenolic resins, phenoxy resins, epoxy resins, hardening type polyurethane resins, urea resins, melamine resins, alkyd resins, silicone resins, reactive acrylic resins, epoxy-polyamide resins, nitrocellulose-melamine resins, mixtures of high molecular weight polyester resins and isocyanate prepolymers, mixtures of polyester-polyols and polyisocyanates, urea-formaldehyde resins, mixtures of polyisocyanates such as low molecular weight glycols/high molecular weight diols/triphenylmethane triisocyante, polyamine resins, polyimine resins and mixtures thereof.

The radiation hardening type resins include the above-described thermoplastic resins to which groups having carbon-carbon unsaturated bonds are linked as radiation hardening functional groups. Preferred examples of such functional groups include an acryloyl group and a methacryloyl group.

Polar groups such as —OH, —COOM, —SO$_3$M, —OSO$_3$M, —PO$_3$M$_2$, —OPO$_3$M$_2$ (in the above formulae, M represents a hydrogen atom, an alkali metal (e.g., sodium or potassium) or ammonium, and when on group contains a plurality of M groups, these groups may be the same or different), —NR$_2^5$, —N⊕R$_3^6$X⊖ (in the above formulae, R$^5$ and R$^6$ each represent a hydrogen atom or an alkyl group, and X represents a halogen atom) and an epoxy group are preferably introduced in the molecules of the above noted binders. The content of the polar group is preferably from $1 \times 10^{-3}$ to $1 \times 10^{-7}$ equivalent, and more preferably from $1 \times 10^{-4}$ to $1 \times 10^{-6}$ equivalent, per g of binder.

The polymer binders described above can be used alone or in combination. Known isocyanate cross-linking agents, for example, polyisocyanate compounds each having at least two isocyanate groups such as tolylene diisocyanate, 4,4'-diphenylmethane diisocyanate and hexamethylene diisocyanate, and/or radiation hardening type vinyl monomers or oligomers can be added to the binder, followed by hardening treatment.

The amount of the binder is generally from 5 to 100 parts by weight, preferably from 10 to 40 parts by weight, per 100 parts by weight of the ferromagnetic metal powder.

Examples of the ferromagnetic metal powder for use in the present invention include compositions comprising a metal component of at least 75% by weight, at least 80% by weight of the metal component being at least one metal or alloy (for example, Fe, Co, Ni, Fe-Co, Fe-Ni, Co-Ni, Co-Ni and Co-Fe-Ni) and 20% or less by weight of the metal component constituted by another component (for example, Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te and Bi). The above-described ferromagnetic metal components may be contain a small amount of water, hydroxides or oxides.

Methods for producing the above described ferromagnetic metal powders are known in the art, and the ferromagnetic metal powders for use in the present invention can also be prepared by known methods.

There is no particular limitation on the shape and size of the ferromagnetic metal powder, which can be used over a wide range of shapes and sizes.

The shape may be any of acircular, ellipsoidal, spherical, cubic and tabular forms. The acicular and tabular forms are preferred from the viewpoint of electromagnetic characteristics. While there is also no particular limitation on the crystalline size and specific surface area, the crystalline size is preferably 400 Å or less, and the specific surface area measured by the BET method ($S_{BET}$) is preferably 30 m$^2$/g or more. The ferromagnetic metal powder can be used without particular limitation of the pH and surface treatment thereof. The ferromagnetic powder may be surface treated prior to addition to the coating solution with substances containing elements such as titanium, silicon and aluminum, or with organic compounds such as adsorptive compounds having N-containing heterocyclic compounds such as carboxylic acids, sulfonic acids, sulfate esters and benzotriazole. The pH of the ferromagnetic metal powder measured by the method according to JIS K5101A is preferably 3 to 11, and more preferably 6 to 10.

Examples of materials for preparing the non-magnetic support for use in the present invention include polyesters such as polyethylene terephthalate and polyethylene 2,6-naphthalate; polyolefins such as polyethylene and polypropylene; cellulose derivatives such as cellulose triacetate; and resins such as polycarbonates, polyimides and polyimideamides. The support may be metallized prior to coating with a metal such as aluminum, or covered with a metal foil such as aluminum foil and stainless steel foil.

The support may be any of a tape, disk, film, sheet, card and drum form, and various materials for preparing the support are selected depending on the intended application.

The thickness of the support is generally from 3 to 100 μm. In the case of magnetic tapes, the support preferably has a thickness of from 3 to 20 μm, and in the case of magnetic disks, the support usually has a thickness of from 20 to 100 μm.

The magnetic layer of the magnetic recording medium of the present invention preferably further contains inorganic particles having a Mohs' hardness of 5 or more.

There is no particular limitations as to the inorganic particles, as long as the Mohs' hardness thereof is 5 or more. Examples of inorganic particles having a Mhos' hardness of 5 or more include Al$_2$O$_3$ (Mohs' hardness: 9), TiO (Mohs' hardness: 6), TiO$_2$ (Mohs' hardness: 6.5), SiO$_2$ (Mohs' hardness: 7), SnO$_2$ (Mohs' hardness: 6.5), Cr$_2$O$_3$ (Mohs' hardness: 9) and α-Fe$_2$O$_3$ (Mohs' hardness: 5.5). The inorganic particles can be used alone or in combination.

Inorganic particles having a Mohs' hardness of 8 or more are particularly preferred. When inorganic particles having a Mohs' hardness of less than 5 are used, the inorganic particles are readily separated from the magnetic layer and provide little abrasive action to the magnetic heads. As a result, head clogging tends to occur, and the running durability is also deteriorated.

The content of the inorganic particles in the magnetic layer is generally from 0.1 to 20 parts by weight, and preferably from 1 to 10 parts by weight, per 100 parts by weight of the ferromagnetic metal powder.

The magnetic layer preferably contains carbon black (more particularly, carbon black having an average particle size of 10 to 300 nm (nanometer: $10^{-9}$ m)), in addition to the above-described inorganic particles.

Examples of methods for preparing the magnetic recording medium of the present invention are described below.

First, the ferromagnetic powder, the binder and the compound of the present invention, and other fillers and additives if necessary, are kneaded with a solvent to prepare a magnetic coating composition. For kneading, known solvents typically employed for the preparation of magnetic coating composition can be used.

There is also no restriction on the method of kneading, and the order of adding the respective components is appropriately determined by one of ordinary skill in the art.

For example, the fillers, the additives and a crosslinking agent are first dissolved in an organic solvent to prepare a solution, and the solution can be added to a ferromagnetic powder dispersion prepared from the solvent, the binder and the ferromagnetic metal powder.

When the magnetic coating composition is prepared, known additives such as a dispersing agent, an antistatic agent and a lubricating agent can also be added thereto.

Examples of the dispersing agents include known dispersing agents such as fatty acids having 12 to 22 carbon atoms, salts or esters thereof, compounds obtained by replacing hydrogen atoms of the above compounds partially or wholly with fluorine atoms, amides of the above-described fatty acids, aliphatic amines, higher alcohols, sarcosinates, alkyl ether esters, trialkyl polyolefins, oxygammonium salts and lecithin.

The dispersing agent is generally employed in an amount of from 0.1 to 10 parts by weight per 100 parts by weight of ferromagnetic powder.

Examples of antistatic agents include conductive fine powders such as carbon black and carbon black graft polymers; natural surface active agents such as saponin; nonionic surface active agents such as alkylene oxide series surface active agents, glycerol series surface active agents and glycidol surface active agents; cationic surface active agents such as higher alkylamines, quaternary ammonium salts, salts of heterocyclic compounds such as pyridine, phosphoniums and sulfoniums; anionic surface active agents containing acid groups such as carboxylic acid, phosphoric acid, sulfate groups and phosphate groups; and amphoteric surface active agents such as amino acids, aminosulfonic acids and sulfates or phosphates of aminoalcohols.

When the above-described conductive fine powder is used as a antistatic agent, the conductive fine powder is added in an amount of from 0.1 to 10 parts by weight based on 100 parts by weight of the ferromagnetic powder. When a surface active agent is used, the surface active agent is added in an amount of from 0.1 to 10 parts by weight based on 100 parts by weight of the ferromagnetic powder.

The above-described additives such as the dispersing agents, the antistatic agents and the lubricating agents are not necessarily limited to the above-described function and effect. For example, the dispersing agent can also function as a lubricating agent or an antistatic agent. It is therefore understood that the function and effect of the compounds exemplified by the above classifications are not limited to those classifications. When a material having a plurality of functions and effects is used, the addition amount thereof is preferably determined in consideration of those functions and effects.

The above-described non-magnetic support is coated with the magnetic coating composition thus prepared. At this time, plural magnetic coatings may be applied sequentially or simultaneously. The non-magnetic support can be coated with the magnetic coating directly or through an interlayer such as an adhesive layer. The interlayer for use in the present invention can be a single layer of an adhesive or a composite layer composed of a binder and non-magnetic fine particles such as carbon black dispersed therein.

The binder for the interlayer containing carbon black can be selected from the various binders for use in the magnetic layer. The particle size of the carbon black is preferably from 10 to 50 nm (nanometer: $10^{-9}$ m), and the weight ratio of the binder to carbon black is preferably 100/10 to 100/150. The thickness of the interlayer is preferably 0.1 to 2 $\mu$m in the case of the single adhesive layer, and 0.5 to 1 $\mu$m in a case of the composite layer containing the non-magnetic powder.

In addition, the interlayer may contain a lubricating agent which is the same as or different from that used in the magnetic layer.

For details of the methods of dispersing the ferromagnetic powders and the binders and the methods of coating the magnetic coatings on the support, reference can be made, for example, to JP-A-54-46011 and JP-A-54-21805.

The dry thickness of the magnetic layer thus formed by coating is generally about 0.5 to 10 $\mu$m, and preferably from 0.7 to 6.0 $\mu$m.

When the magnetic recording medium is used in a tape form, the magnetic layer formed on the non-magnetic support is usually subjected to orientation treatment of the ferromagnetic powder contained in the magnetic layer followed by drying. On the other hand, in the case of a disk-type medium, the magnetic layer is subjected to treatment by a magnetic field to remove the anisotropy of magnetic characteristics. The magnetic layer is thereafter subjected to surface smoothing treatment, if necessary. Then, heat hardening treatment and/or hardening treatment by irradiation is carried out, if necessary, followed by cutting into a desired shape.

The surface of the non-magnetic support on the side opposite to that having the magnetic layer may be provided with a backing layer known in the art as described, for example, in U.S. Pat. Nos. 4,728,569, 4,367,261, 4,474,843 and 4,388,360.

In accordance with the present invention, the number of DOs, the occurrence of head clogging and the running tension are significantly improved by adding the branched chain fatty acids of the present invention having branched carbon chains of the same length to the magnetic layer containing the ferromagnetic metal powder. Namely, the use of the branched chain fatty acids having long branches of the same carbon chain length results in a drop in melting point due to the branches, to thereby remarkably reduce the generation of white powder. At the same time, the branched chain fatty acids of the present invention are readily oriented on the surface of the magnetic layer due to their long carbon chains, such that the reduction in $\mu$ value is pronounced and the running tension is improved.

The present invention is described below in more detail with reference to the nonlimiting examples and comparative examples, but the present invention is not construed as being limited thereto. All parts used herein are given by weight.

EXAMPLES 1 TO 11 AND COMPARATIVE EXAMPLE 1 TO 6

The following magnetic layer composition (I) was kneaded in a kneader to provide a uniform mixture. Next, composition (II) was added thereto, and dispersed by mixing. Composition (III) was thereafter added thereto, and dispersed to prepare a magnetic coating composition.

| Magnetic Layer Composition (I) | |
|---|---|
| Ferromagnetic metal powder (Fe/Ni/Co = 94/4/2, Hc: 1,600 Oe, $S_{BET}$: 55 m$^2$/g) | 100 parts |
| Vinyl chloride resin (MR110, manufactured by Nippon Zeon Co., Ltd.) | 12 parts |
| Polyurethane resin (UR8600, manufactured by | 3 parts |

-continued

| | |
|---|---|
| Toyobo Co., Ltd.) | |
| Dispersing agent: oleic acid | 0.5 part |
| Methyl ethyl ketone | 12 parts |
| Cyclohexanone | 36 parts |
| Magnetic Layer Composition (II) | |
| Abrasive agent: alumina | 5 parts |
| (Hit50, manufactured by | |
| Sumitomo Chemical Co., Ltd.) | |
| Carbon black | 1 part |
| (#975, manufactured by | |
| Columbian Carbon Co.) | |
| Polyurethane resin | 4 parts |
| (UR8600, manufactured by | |
| Toyobo Co., Ltd.) | |
| Methyl ethyl ketone | 20 parts |
| Magnetic Layer Composition (III) | |
| Polyisocyanate | 5 parts |
| (C3040, manufactured by | |
| Nippon Polyurethane Industry Co., Ltd.) | |
| Lubricating agent: fatty acid A | X part(s) (shown in Table 1) |
| Lubricating agent | 2 parts |
| (isotridecyl stearate) | |
| Methyl ethyl ketone | 200 parts |

After adjustment of the viscosity, the resulting coating solution of was applied to 7 μm-thick non-magnetic polyethylene terephthalate supports to provide a thickness of 2.5 μm after drying. Then, the layers thus formed were dried by a multi-step zone method at 30° to 100° C., while magnetic field orientation was conducted in the coating advance direction with opposed cobalt magnets of 3,000 gauss. The magnetic layers were thereafter successively subjected to calender treatment, to thereby obtain tapes provided with magnetic layers having a center line average surface roughness of 4 nm. The following backing layers having a thickness of 0.4 μm were continuously formed on the back surfaces of the non-magnetic supports provided with the magnetic layers, and subjected to heat treatment, followed by slitting to a width of 0.5 inch. Then, the magnetic layers were surface treated with a diamond edge to produce tapes.

| | |
|---|---|
| Backing Layer Composition (I) | |
| Carbon black | 100 part |
| (BP800, manufactured by Cabot Co.) | |
| Carbon black | 1 part |
| (Thermax MT manufactured by Cancarb Co.) | |
| Nitrocellulose | 25 parts |
| (manufactured by Daicel Chemical Industries, Ltd.) | |
| Polyurethane resin | 25 parts |
| (UR8600, manufactured by Toyobo Co., Ltd.) | |
| Phenoxy resin | 10 parts |
| (PKHH, manufactured by Union Carbide Corp.) | |
| Methyl ethyl ketone | 300 parts |
| Back Layer Composition (II) | |
| Polyisocyanate | 10 parts |
| (C3040, manufactured by Nippon Polyurethane Co., Ltd.) | |
| Abrasive agent: alumina | 0.3 part |
| (Hit100, manufactured by Sumitomo Chemical Co., Ltd.) | |
| Copper oleate | 0.1 part |
| Barium sulfate | 0.1 part |
| (BF-1L, manufactured by Sakai Kagaku Co.) | |
| Methyl ethyl ketone | 700 parts |

Calender Treatment Conditions

Calender treatment was carried out by using a five-step roll unit constituted by metal rolls and elastic rolls stacked alternatively under the following conditions;
Temperature of the metal rolls: 90° C.
Transferring speed of the calender: 150 m/min
Line pressure: 250 kg/cm

Diamond Edge Treatment

A diamond wheel (diameter: 25 mm, width: 25.6 mm, particle size: No. 2000, manufactured by Orient Dia Co.) in which diamond was sintered around an iron core member to a thickness of 1.5 mm was driven for rotation at 2,000 rpm is the opposite direction to the running direction of the magnetic layers, to thereby grind the tapes at a contact angle of 80 degrees.

267 m of each tape was rolled in an MII cassette manufactured by Matsushita Electric Industrial Co., Ltd.

The properties of the resulting tapes were evaluated under the following conditions. The results are shown in Table 1 for the branched chain fatty acids of the present invention, and in Table 2 for branched chain fatty acids other than those of the present invention, except for Comparative Example 6.

Evaluation Methods

1. Number of drop outs:

After storage at 60° C. at 80% RH for 3 weeks, each tape was loaded in an MII VTR manufactured by Matsushita Electric Industrial Co., Ltd. The number of drop outs (DOs) was measured at −16 dB for 15 μsec and shown by the number per minute.

2. Head Clogging

After storage at 60° C. at 80% RH for 3 weeks, the reduction in RF output (RF drop) occurring during overall length running was measured with an MII VTR manufactured by Matsushita Electric Industrial Co., Ltd. under conditions of 5° C. and 80% RH. The number of RF drops higher than 1 db was examined.

3. Running Tension

The running tension of each tape on an MII VTR manufactured by Matsushita Electric Industrial Co., Ltd. was measured with a tension gauge for VTRs at 23° C. at 60% RH.

A tension of 35 g or less is considered to be at practically useful level.

TABLE 1

| | Fatty acid A (m, n in formula (I)) | X (part) | Number of DOs | Head clogging | Running tension (g) |
|---|---|---|---|---|---|
| Example 1 | 3-Nonyldodecanoic acid (m = 1, n = 8) | 0.5 | 15 | No occurrence | 33 |
| Example 2 | 3-Nonyldodecanoic acid (m = 1, n = 8) | 1 | 15 | No occurrence | 30 |
| Example 3 | 3-Nonyldodecanoic acid (m = 1, n = 8) | 2 | 16 | No occurrence | 30 |
| Example 4 | 3-Nonyldodecanoic acid (m = 1, n = 8) | 3 | 16 | No occurrence | 30 |
| Example 5 | 3-Nonyldodecanoic acid (m = 1, n = 8) | 1 | 13 | No occurrence | 25 |
| Example 6 | 3-Nonyldodecanoic acid (m = 1, n = 8) | 2 | 16 | No occurrence | 25 |
| Example 7 | 3-Undecyltetradecanoic acid (m = 1, n = 10) | 1 | 12 | No occurrence | 25 |
| Example 8 | 3-Undecyltetradecanoic acid (m = 1, n = 10) | 2 | 13 | No occurrence | 25 |

TABLE 1-continued

| | Fatty acid A (m, n in formula (I)) | X (part) | Number of DOs | Head clogging | Running tension (g) |
|---|---|---|---|---|---|
| Example 9 | 2-Decyldodecanoic acid (m = 0, n = 9) | 1 | 15 | No occurrence | 25 |
| Example 10 | 2-Decyldodecanoic acid (m = 0, n = 9) | 2 | 15 | No occurrence | 25 |
| Example 11 | 2-Dodecyltetradecanoic acid (m = 0, n = 11) | 2 | 18 | No occurrence | 25 |

TABLE 2

| | Fatty acid A | X (part) | Number of DOs | Head clogging | Running tension (g) |
|---|---|---|---|---|---|
| Comparative Example 1 | Myristic acid ($C_{13}H_{27}COOH$) | 2 | >200 | 10 | 20 |
| Comparative Example 2 | Stearic acid ($C_{17}H_{35}COOH$) | 2 | >200 | 7 | 20 |
| Comparative Example 3 | Behenic acid ($C_{21}H_{43}COOH$) | 2 | >200 | 12 | 20 |
| Comparative Example 4 | 3-Pentyloctanoic acid | 2 | 16 | No occurrence | 45 |
| Comparative Example 5 | 3-Heptyldecanoic acid | 2 | 14 | No occurrence | 40 |
| Comparative Example 6 | 3-Nonyldodecanoic acid | 4 | 13 | No occurrence | 40 |

It is clearly seen from the results shown in Tables 1 and 2 that Examples 1 to 11 containing the compounds of the present invention provided good results with respect to each of the number of DOs, head clogging and running tension. In contrast, Comparative Examples 1 to 3 in which lubricating agents other than the compounds of the present invention were used were adequate with respect to running tension, but were inferior in the number of DOs and head clogging. Comparative Examples 4 to 6 were inferior in running tension. Comparative Example 6 was considered to be inferior to Examples 1 to 11 in running tension because the addition amount exceeded the upper limit as prescribed herein, although the compound of the present invention was used.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having thereon a magnetic layer containing a ferromagnetic powder, a branched chain fatty acid, a branched chain fatty acid ester and a binder, said ferromagnetic powder being a ferromagnetic metal powder, and the branched chain fatty acid contained in the magnetic layer consists essentially of compounds represented by formula (I):

$$R_2(CH_2)_m COOH \qquad (I)$$

wherein R represents $CH_3(CH_2)_n$, n represents an integer of 8 or more, and m represents 0 or 1 in an amount of from 0.5 to 3 parts by weight per 100 parts by weight of said ferromagnetic metal powder, said branched chain fatty acid is selected from the group consisting of a branched chain fatty acid represented by formula (I) wherein m is 1 and n is 8 or 10, and a branched chain fatty acid represented by formula (I) wherein m is 0 and n is 9, 11 or 14.

2. A magnetic recording medium as in claim 1, wherein the branched chain fatty acid ester has a melting point of 20° C. or less.

3. A magnetic recording medium as in claim 1, wherein the center line average surface roughness (Ra) of said magnetic layer is 15 nm or less.

4. A magnetic recording medium as in claim 1, wherein said binder contains a polar group in an amount of from $1 \times 10^{-3}$ to $1 \times 10^{-7}$ equivalent per g of binder.

* * * * *